US006828561B2

(12) United States Patent
Layman et al.

(10) Patent No.: US 6,828,561 B2
(45) Date of Patent: Dec. 7, 2004

(54) APPARATUS AND METHOD FOR DETECTING ALPHA PARTICLES

(75) Inventors: Paul Arthur Layman, Orlando, FL (US); Samir Chaudhry, Weston, FL (US); James Gary Norman, Orlando, FL (US); J. Ross Thomson, Clermont, FL (US)

(73) Assignee: Agere Systems Inc., Allentown, PA (US)

( * ) Notice: Subject to any disclaimer, the term of this patent is extended or adjusted under 35 U.S.C. 154(b) by 73 days.

(21) Appl. No.: 10/260,694

(22) Filed: Sep. 30, 2002

(65) Prior Publication Data

US 2004/0061060 A1 Apr. 1, 2004

(51) Int. Cl.$^7$ ............................................... H01L 29/78
(52) U.S. Cl. ............................. 250/370.02; 250/370.01
(58) Field of Search ...................... 250/370.02, 370.01; 371/40.1; 257/429, 290; 714/763, 764; 365/75, 77, 78

(56) References Cited

U.S. PATENT DOCUMENTS

| 4,009,435 A | * | 2/1977 | Hogg .......................... 324/71.1 |
| 4,104,523 A | | 8/1978 | Wolfert |
| 4,891,514 A | * | 1/1990 | Gjerdrum et al. ............ 250/255 |
| 5,331,164 A | * | 7/1994 | Buehler et al. ......... 250/370.02 |
| 5,612,964 A | * | 3/1997 | Haraszti ...................... 714/763 |

\* cited by examiner

*Primary Examiner*—Constantine Hannaher
*Assistant Examiner*—Otilia Gabor

(57) ABSTRACT

A memory array operates as an alpha particle detector. A predetermined state is stored in each memory storage location. The operating voltage of the memory array is established at a voltage where the stored values are relatively stable and not subject to change except as a result of alpha particle impingement. Impinging alpha particles are detected by the state changes they cause in the memory storage locations.

15 Claims, 4 Drawing Sheets

APPARATUS AND METHOD FOR DETECTING ALPHA PARTICLES

FIELD OF THE INVENTION

The present invention relates generally to a method and apparatus for detecting alpha particles, and more specifically to a detecting method and apparatus utilizing a semiconductor memory array.

BACKGROUND OF THE INVENTION

An alpha particle is a small high-energy positively charged particle comprising a helium nucleus of two protons and two neutrons. The alpha particle exhibits an electrostatic charge of +2. Alpha particles are ejected spontaneously from the nuclei of some radioactive elements as they disintegrate. The alpha particle has a low penetrating power and a short range (a few centimeters in air). The most energetic alpha particles typically fail to penetrate the dead layers of cells covering the skin and can be easily stopped by a sheet of paper. However, alpha particles are hazardous when an alpha-emitting isotope is inside the human body.

In any area where radioactive materials are handled, it is imperative, both for the protection of personnel and to avoid contamination of the environment, to continuously monitor personnel, equipment, and clothing to identify the release of radioactive contamination and to identify the radioactive source. Alpha particle contaminants, such as plutonium, are particularly difficult to detect because of the limited penetration of alpha particles in air.

Three types of alpha particle detectors are known in the prior art: the scintillation counter, the gas counter, and the solid state junction counter.

In the early scintillation counter the scintillator material was viewed with a microscope to count the individual flashes of light produced when an alpha particle is stopped by a collision within the material. In the modern scintillation counter, scintillation material is deposited on the photocathode of a photomultiplier tube that amplifies the signal and provides information about the energy of the alpha particle, in addition to counting the alpha particles. The window through which the alpha particles pass into the scintillator material must be thin enough to allow transmission of the low energy alpha particles, but thick enough to form an opaque light seal.

Gas-filled alpha particle detectors use a specific gas as the detector material depending upon the operational mode, i.e., operation as a Geiger counter or as an ionization/proportional counter. The alpha particle enters the gas-filled ionization zone through a thin, fragile plastic or metal window. The output signal pulse is constant in the Geiger counter operation, and is related to the alpha particle energy in the ionization or proportional counter.

The semiconductor junction counter is a solid state p-n junction with a reverse bias that collects ionization charge from the passage of an alpha particle through the depletion layer. The alpha particle enters the counter through a metallic electrode detector window, which blocks ambient light while allowing the alpha particles to pass. At least one amplification stage is required to register an event and several stages of amplification are typically necessary to extract information representing the alpha article.

As charged particles, such as alpha particles, move through the p-n junction of a semiconductor device, they give up kinetic energy to electrons in the valence band of the semiconductor material. The electron moves through the band gap into the conduction band, where an electron-hole pair is formed. As is known, for electron-hole pairs created in a reverse biased junction, the electrons and holes are swept away by the electric field of the junction, creating a current representative of the density of the electron-hole pairs, and thus a current representative of the alpha particle density. Conventionally, a high sensitivity alpha particle detector comprises a plurality of parallel-connected diodes formed on a single die. However, such detectors can be costly and difficult to construct as they require low noise and high gain amplifications stages to detect individual alpha particles. Also, reverse biased diodes can exhibit considerable shot noise that limit their usefulness in detecting low alpha particle

BRIEF SUMMARY OF THE INVENTION

A method and apparatus for detecting alpha particles using a memory array having a plurality of memory storage locations responsive to an operating voltage. Initial values are stored in the plurality of memory storage locations of the memory array. The operating voltage is reduced and the memory storage locations that maintain the initial stored value are determined. These memory locations are then available to detect the impingement of alpha particles. Individual memory cells consist of moderate gain feedback elements. Because the voltage is reduced below the nominal operating voltage of the memory array, and at this voltage the shot noise is low, a sensitive alpha particle detector is realized.

BRIEF DESCRIPTION OF THE DRAWINGS

The foregoing and other features of the invention will be apparent from the following more particular description of the invention, as illustrated in the accompanying drawings, in which like reference characters refer to the same parts throughout the different figures. The drawings are not necessarily to scale, emphasis instead being placed upon illustrating the principles of the invention.

DETAILED DESCRIPTION OF THE INVENTION

Figure 1:
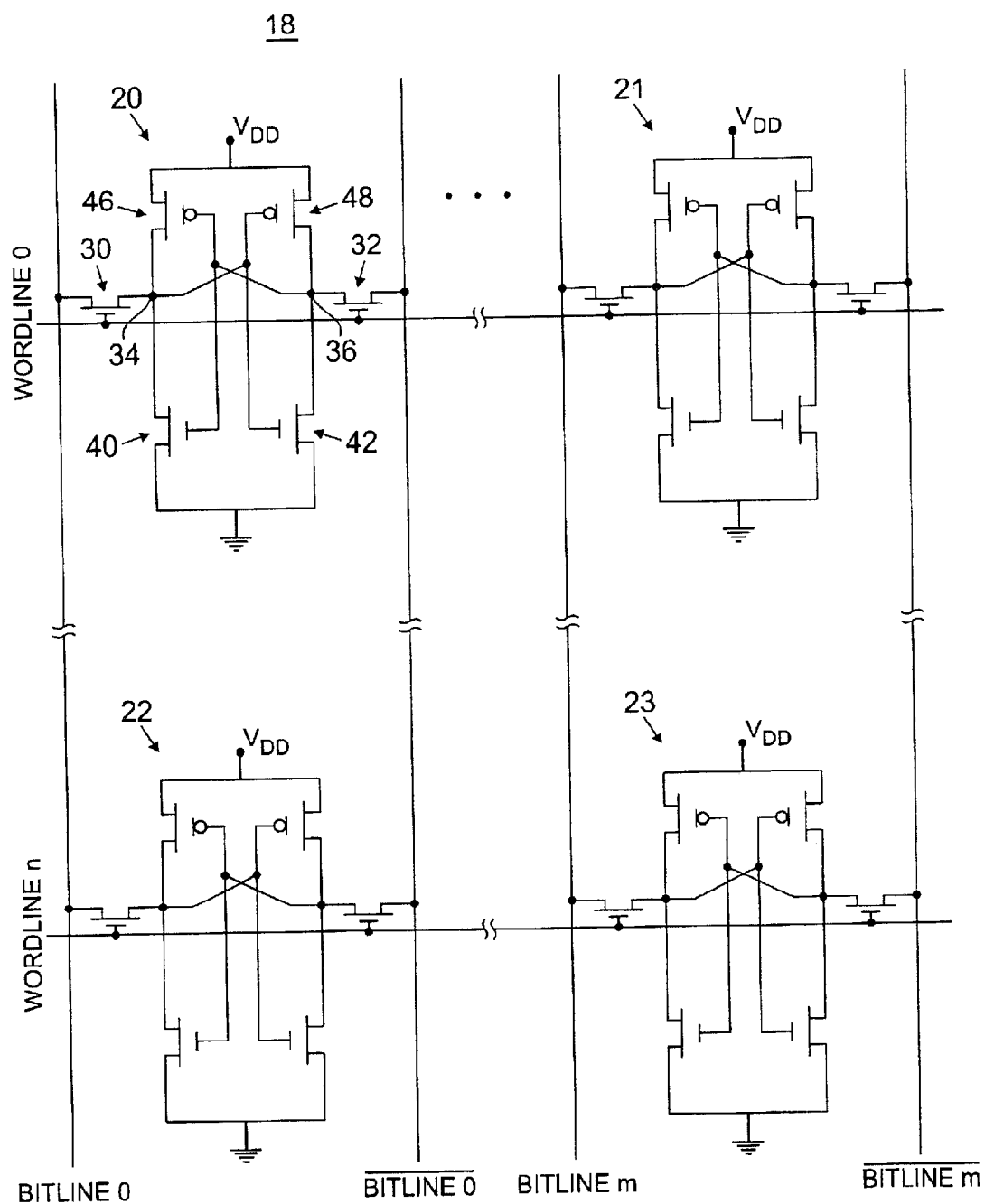
FIG. 1 is a schematic diagram of a static random access memory array.

Before describing in detail the particular alpha particle detector according to the teachings of the present invention, it should be observed that the present invention resides primarily in a novel combination of hardware elements and method steps. Accordingly, the elements and steps have been represented by conventional elements in the drawings, showing only those specific details that are pertinent to the present invention, so as not to obscure the disclosure with structural details that will be readily apparent to those skilled in the art having the benefit of the description herein.

Random access memory arrays, especially static random access memories, are well known in the art. Such arrays are comprised of a plurality of memory cells, each cell storing a single bit of information in the form of a binary 1 or a binary 0. Each cell is essentially a flip-flop positioned at the intersection of an array of row and column address lines. Specifically, each cell is positioned at the intersection of a word line, for selecting a row of the memory array, and a set of complimentary bit lines (i.e., a bit line and an inverse bit line) for selecting a column of the array. These memories provide random access in the sense that each cell can be individually addressed for read and write operations in response to an address provided to a row and column address decoder, that in turn selects the intended cell at the intersection of the row and column address lines. Generally, the row or wordline is selected first, enabling all the cells on the selected row. The bitline and the inverse bitline select the individual column bit from among the selected row of cells, for reading a bit from or writing a bit to the selected cell over the bitline and the inverse bitline.

FIG. 1 is an exemplary schematic of four such adjacent static random access (SRAM) cells 20, 21, 22 and 23 constituting an SRAM memory array 18, having n wordlines (wordline 0 to wordline n) and m bitlines (bitline 0 to bitline m). Each of the memory cells 20, 21, 22 and 23 comprises six metal-oxide field-effect transistors (MOSFETS) arranged as two cross-coupled complementary MOSFETS (i.e., CMOS) inverters. Each of the cells 20, 21, 22 and 23 includes the same basic components and functions in the same manner. Thus only the cell 20 is described in detail.

The cell 20 includes NMOS switching transistors 30 and 32 having their gate terminals connected to a wordline 0. Source and drain terminals of the transistor 30 are connected between a bitline 0 and a node 34. Source and drain terminals of the transistor 32 are connected between an inverse bitline 0 and a node 36. A first source/drain terminal of NMOS transistors 40 and 42 is connected to ground. A first source/drain terminal of PMOS transistors 46 and 48 is connected to a supply voltage, designated $V_{DD}$. A second source/drain terminal of the transistors 40 and 42 is connected to a second source/drain terminal of the transistors 46 and 48 at the nodes 34 and 36, respectively. The node 34 is further connected to a gate terminal of each transistor 42 and 48. The node 36 is further connected to a gate terminal of each transistor 40 and 46.

In operation, the cross-coupling of the two CMOS inverters (where the first inverter comprises the transistors 40 and 46 with the node 34 serving as the output terminal, and the second inverter comprises the transistors 42 and 48 with the node 36 serving as the output terminal) creates a bistable device. If the output of the first inverter is high (that is, the transistor 46 is on, the transistor 40 is off and the voltage at the node 34 is high), the high output voltage at the node 34 is provided as an input to the gate terminals of the transistors 42 and 48 that comprise the second inverter. That is, the transistor 48 is driven off, the transistor 42 is driven on and the voltage on the node 36 is low or at ground potential. Thus the second inverter is driven to a low state.

When the node 34 is high (i.e., the first inverter is high) the state of the cell 20 can be considered a "1" state. If the transistors 40, 42, 46 and 48 are in an opposite state to that described above, the first inverter is low and the second inverter is high. This state can be considered the "0" state for the cell 20. In the "0" state the node 34 is low and the node 36 is high.

To write a bit to the cell 20, the wordline 0 is selected by turning on the transistors 30 and 32. The bitline 0 and the inverse bitline 0 are charged to opposite states ("1" or "0") by a writer-driver, not shown in FIG. 1, and the bit on the bitline 0 is stored to the memory cell 20. If a "1" is to be stored, the bitline 0 is charged to the "1" state, the transistor 48 is driven off by the high voltage at the node 34 and the cross-coupling drives the transistor 46 on. Thus the voltage at the node 34 goes high and a "1" is stored in the cell 20. The inverse bit line is low as the node 36 is effectively grounded when the transistor 48 is off and the transistor 42 is on.

A "0" is stored in the cell 18 by placing a low voltage on the bitline 0 and a high voltage on the inverse bitline 0. These voltages drive the transistor 46 off and the transistor 48 on, as a result the node 34 falls to ground and the node 36 goes high. This condition was defined as a "0" state above.

Figure 2:
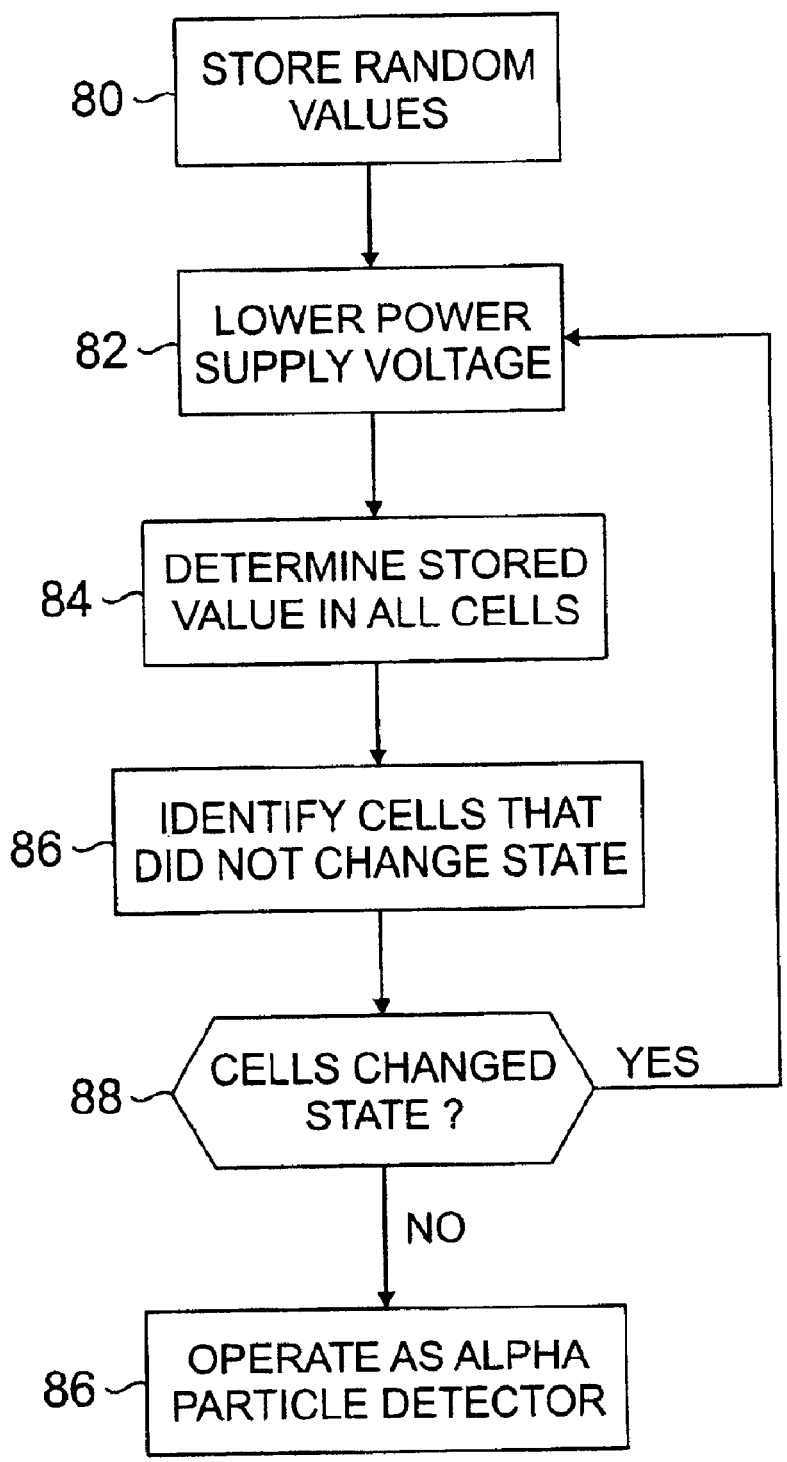
FIG. 2 is a flowchart of an alpha particle detection process according to the teachings of the present invention.

The bit stored in the memory cell 20 is read by selecting the wordline 0 and determining the difference between the voltage on the bitline 0 and the inverse bitline 0. A sense amplifier (not shown in FIG. 2) measures the voltage differential and provides an output bit representative of the stored bit.

As described above, alpha particles impinging on a reverse biased semiconductor junction cause the generation of electron-hole pairs. When an SRAM is subjected to alpha particles, the generated electron-hole pairs represent excess carriers in the MOSFETs and can therefore cause the MOSFET to change state and thus the value stored in the memory cell can change state. These state changes are referred to as "soft" errors in the memory array.

It is known to test SRAMs by loading the cells with a known bit pattern, subjecting them to an alpha particle source and measuring the bit-error rate as determined by the number of memory cells that change state during the test. Generally, the testing is conducted on an accelerated basis, using a source that generates a larger number of alpha particles than would be encountered by an operational SRAM array. Various techniques have been identified for increasing the soft error resistance of SRAM arrays. See for example, U.S. Pat. Nos. 5,524,095, 6,146,936, 6,171,892 and 6,410,414.

As the operating voltage of an SRAM is reduced, the probability of an alpha particle causing a memory cell state change (also referred to as an alpha particle upset) increases. Certain accelerated tests can therefore be conducted by powering the SRAM with a voltage lower than the design operating voltage. These test results can then be extrapolated to determine the expected bit error rate for operation at the designed operating voltage.

According to the teachings of the present invention an SRAM array operates as an alpha particle detector. The sensitivity of the detector is increased by lowering the operating voltage of the SRAM because at lower voltages fewer and lower energy electron-hole pairs are required to change the state of a memory cell, by causing one or more of the MOSFETs comprising the memory cell to change state. Since these electron-hole pairs are formed by alpha particle impinging the SRAM, fewer alpha particles are required to change the state of the memory cell at lower operating voltages.

With respect to the SRAM memory array 18 of FIG. 1, it is known that process spatial variations and non-identical device features can cause each of the transistors in the memory cell 20 to have a different threshold voltage. Among the many factors affecting the threshold voltage are the doping levels of the source and drain regions, the oxide capacitance, and the various oxide and interface trapped charges. When power is first applied to the memory array 18 (i.e., application of the voltage $V_{DD}$ and connection to ground) the imbalance in the threshold voltage factors causes one of the two transistors 46 and 48 to turn on before the other, thus determining the initial state of the memory cell 20 at power up. For example, if the transistor 46 turns on before the transistor 48, the initial state is high at the node 34 and on the bitline 0.

If all the transistors of the array were perfectly matched, the SRAM array and each memory cell of the array would maintain its stored value as the array operating voltage was reduced, even to very low voltage levels. For example, a 0.16 micron process (i.e., where the device features are on the order of 0.16 microns) the stored states should be maintained down to an operating voltage of about 0.04 volts. Below this operating voltage the two inverters comprising the memory cell 20 have a gain of less than unity and therefore the memory cell 20 is not bistable. However, due to the aforementioned transistor mismatches, even at voltages above 0.04 volts the stored values are lost as the MOSFETs within some of the memory cells change state. It has also been observed that a substantial number of the cells can maintain their stored state at operating voltages of about 0.05 to about 0.010 volts.

According to the teachings of the present invention, the SRAM operates as a sensitive alpha particle detector when powered at an operating voltage below the design operating voltage. As illustrated in the FIG. 2 flowchart, at a step 80, random values are stored in the SRAM memory array 18. At a step 82 the operating voltage of the SRAM array 18 is reduced, causing a number of the memory cells, such as the memory cells 20, 21, 22 and 23 to change state.

In one embodiment, the voltage is incrementally reduced to about 0.010 volts. The objective is to reduce the voltage to the point where the memory cells comprising mismatched MOSFETs have changed state. The remaining cells can then serve as an alpha particle detector, as they will flip states only in response to an alpha particle that impinges upon the SRAM memory array 18, generating electron-hole pairs that cause the MOSFETs of the memory cell to change state, thus changing the stored value in the memory cell.

At a step 84, the stored values in the memory cells are determined, and at a step 86 the cells for which the stored values remained unchanged are identified. The incremental operating voltage reduction continues until a minimum operating voltage is reached. Thus a decision step 88 follows the step 86 to determine when the minimum voltage has been reached by determining whether memory cells continue to change states as the operating voltage is lowered at the step 82. As cells continue to change state as the operating voltage is lowered, the process loops back from the decision step 88 to the step 82 where the operating voltage is again lowered. When the response at the decision step 88 is negative, a stable condition has been reached and the remaining cells can be operated as an alpha particle detector, as indicated at a step 90. Since the operating voltage has been reduced to a low value, a minimum number of alpha particles are required to cause a state upset. Thus the SRAM operates as a maximally sensitive alpha particle detector.

Figure 3:
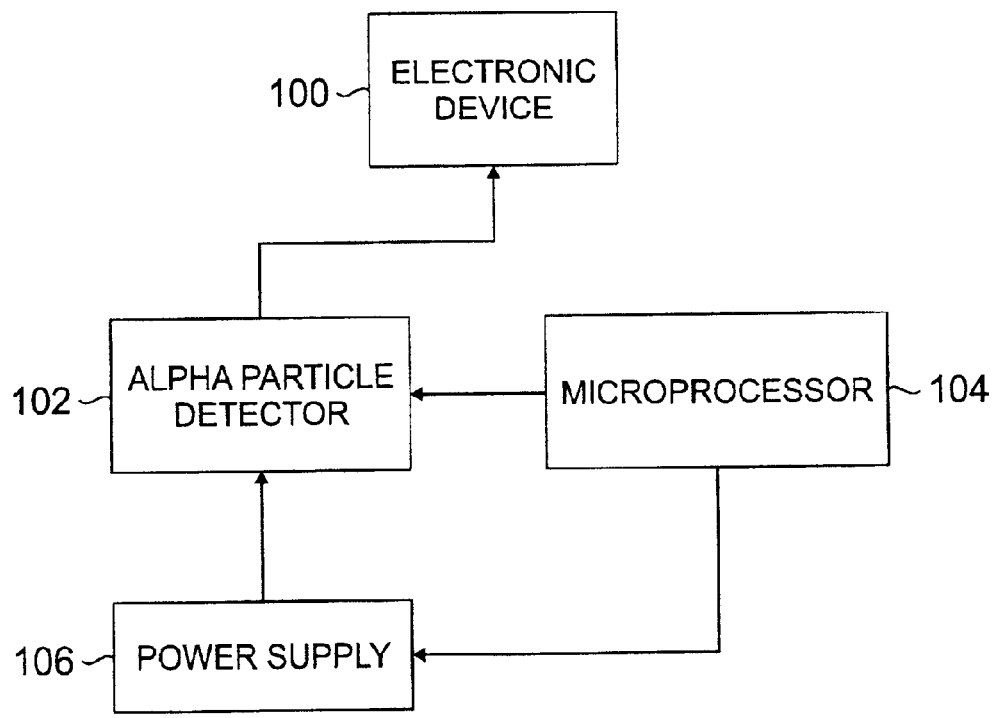
FIG. 3 is a block diagram of an electronic device incorporating an alpha particle detector of the present invention.

FIG. 3 illustrates an electronic device 100, for example a global positioning system (GPS) or a hard disk drive, responsive to an alpha particle detector 102 constructed according to the teachings of the present invention. A microprocessor 104 (or a microcontroller) controls the operating voltage supplied to the alpha particle detector 102 from a power supply 106, and executes the flow chart steps of FIG. 2. Once the process reaches the step 90, the alpha particle detector 102 operates according to the teachings of the present invention. In a preferred embodiment, the microprocessor 104 monitors the detected alpha particles and exercises a control function over the electronic device 100 when the number of alpha particles reaches a predetermined value or when the rate of alpha particle detection exceeds a predetermined value. Other metrics can be established for alpha particle detection and the response of the electronic device 100 thereto. For example, if the electronic device is a hard disk drive, additional error correcting processes or additional error correcting bits can be added to the stored data words in response to a alpha particle rate in excess of a predetermined value. These error correcting bits reduce the probability that a memory upset caused by alpha particles will cause a loss of data stored in the hard disk drive. When the alpha particle impingements rise above a predetermined value, the error correcting processes are returned to their normal state as the additional error correcting capabilities do not significantly decrease the probability of an undetected error in the stored words.

Although the teachings of the present invention have been described with reference to alpha particles, the teachings can be applied to detect any other atomic particles or combinations of atomic particles that cause the generation of an electron-hole pair, such that the state of the MOSFET's comprising a memory cell can change in response to such electron-hole pairs.

Figure 4:
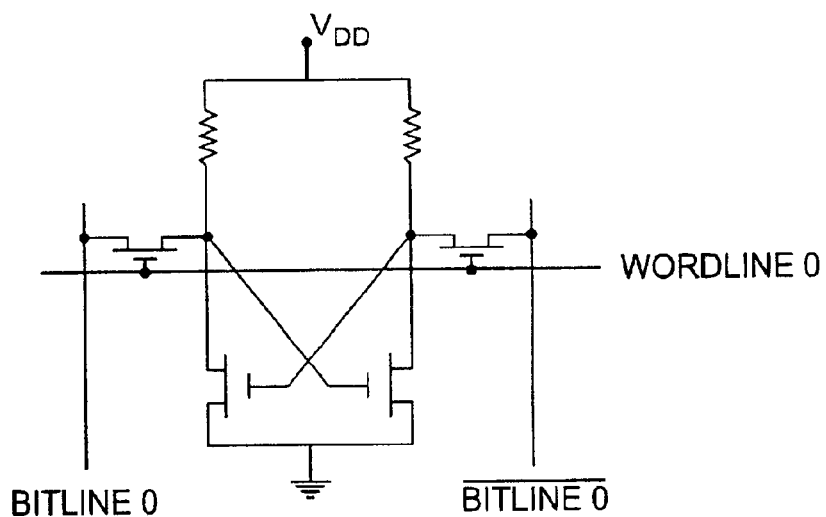
FIGS. 4 through 6 are schematic diagrams of alternative embodiments of memory cells for a static random access memory.
Figure 5:
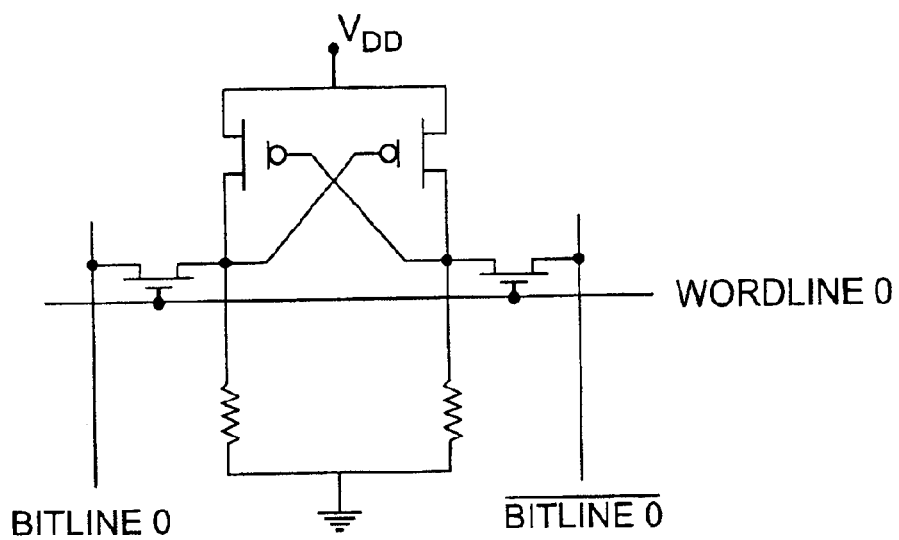
Figure 6:
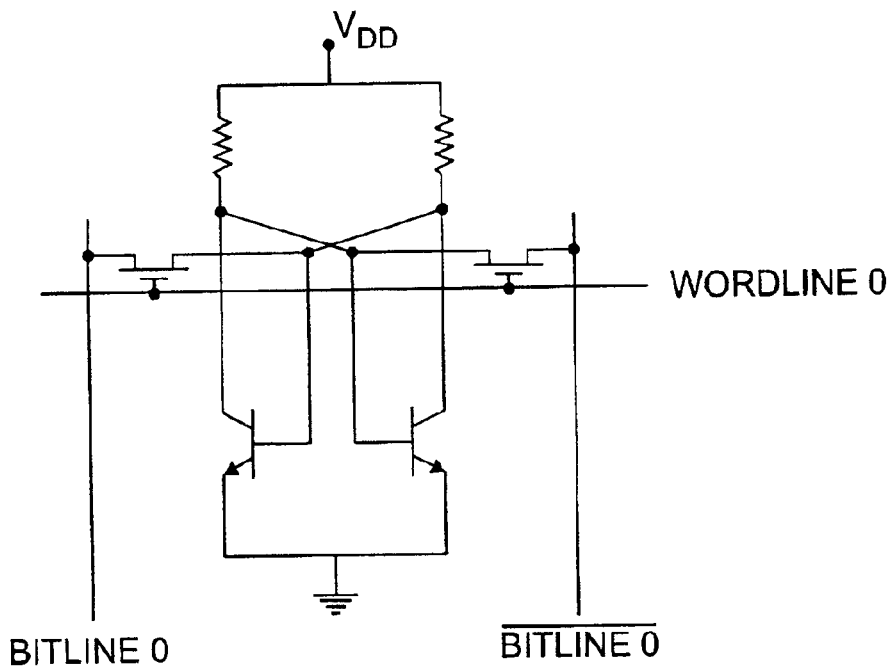

In other embodiments of the present invention, NMOS, PMOS and bipolar transistor configurations, including their associated resistors, as illustrated in FIGS. 4, 5 and 6, form the memory cells 20, 21, 22 and 23, a plurality of which form the memory array 18. Operation of these embodiments is similar to the cross-coupled CMOS embodiment described above. The alpha particle generates electron-hole pairs that change the state of the transistors comprising the memory cell 20, 21 22 or 23. Thus a plurality of the memory cells 20, 21, 22 and 23 can be made to operate as an alpha particle detector.

While the invention has been described with reference to preferred embodiments, it will be understood by those skilled in the art that various changes may be made and equivalent elements may be substituted for elements thereof without departing from the scope of the present invention. The scope of the present invention further includes any combination of the elements from the various embodiments set forth herein. In addition, modifications may be made to adapt a particular situation to the teachings of the present invention without departing from its essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for detecting atomic particles or combinations of atomic particles impinging upon a memory array comprising a plurality of memory storage locations and responsive to an operating voltage, comprising:

(a) storing an initial state in each one of the plurality of memory storage locations;

(b) reducing the operating voltage below a design operating voltage until substantially none of the plurality of memory storage locations change state as the operating voltage is further reduced;

(c) identifying memory storage locations maintaining the initial state; and (d) detecting atomic particles or combinations of atomic particles impinging upon the memory array based on a state change of one or more of the identified memory storage locations.

2. The method of claim 1 wherein the memory array comprises a static random access memory array.

3. The method of claim 2 wherein each one of the plurality of memory storage locations comprises two cross-coupled complimentary metal-oxide-semiconductor inverters, and wherein the cross-coupled complimentary metal-oxide-semiconductor inverters are in opposing states according to the initial state.

4. The method of claim 3 wherein the impinging atomic particles or combinations of atomic particles generate an electron-hole pair within one of the plurality of memory storage locations, and wherein the electron-hole pair causes the two cross-coupled complimentary metal-oxide-semiconductor inverters of the one of the plurality of memory storage locations to change state.

5. The method of claim 2 wherein each one of the plurality of memory storage locations comprises two cross-coupled NMOS devices, and wherein the cross-coupled NMOS devices are in opposing states according to the initial state, and wherein the impinging atomic particles or combinations of atomic particles generate an electron-hole pair within one of the plurality of memory storage locations, and wherein the electron-hole pair causes the two cross-coupled NMOS devices of the one of the plurality of memory storage locations to change state.

6. The method of claim 2 wherein each one of the plurality of memory storage locations comprises two cross-coupled PMOS devices, and wherein the cross-coupled PMOS devices are in opposing states according to the initial state, and wherein the impinging atomic particles or combinations of atomic particles generate an electron-hole pair within one of the plurality of memory storage locations, and wherein the electron-hole pair causes the two cross-coupled PMOS devices of the one of the plurality of memory storage locations to change state.

7. The method of claim 2 wherein each one of the plurality of memory storage locations comprises two cross-coupled bipolar transistors, and wherein the cross-coupled bipolar transistors are in opposing states according to the initial state, and wherein the impinging atomic particles or combinations of atomic particles generate an electron-hole pair within one of the plurality of memory storage locations, and wherein the electron-hole pair causes the two cross-coupled bipolar transistors of the one of plurality of memory storage locations to change state.

8. The method of claim 1 wherein the initial state is a binary "1" or a binary "0."

9. The method of claim 1 wherein the step (b) is executed until the operating voltage reaches a predetermined value.

10. The method of claim 1 wherein the step (d) further comprises determining the memory locations that have changed state due to the impingement of an atomic particle or a combination of atomic particles.

11. The method of claim 1 wherein the atomic particles or combinations of atomic particles comprise alpha particles.

12. An apparatus for detecting atomic particles or combinations of atomic particles, comprising:
    a supply voltage;
    a memory array comprising a plurality of memory storage locations, wherein an initial binary state is stored in each of the plurality of memory storage locations, and wherein the supply voltage is selected such that substantially none of binary states change from the initial binary state unless the apparatus is subjected to impingement by an atomic particle or a combination of atomic particles, wherein the binary state of one or more of the plurality of memory storage locations changes in response to the atomic particle or combination of atomic particles; and
    a detector for detecting binary state changes.

13. The apparatus of claim 12 wherein the supply voltage is selected such that the impingement of the apparatus by an atomic particle or a combination of atomic particles causes the binary state of one or more of the memory storage locations to change.

14. The apparatus of claim 12 further comprising an electronic device operative in response to the detector, wherein the operational mode of the electronic device is responsive to the impingement by an atomic particle or a combination of atomic particles.

15. The apparatus of claim 14 wherein the electronic device is operative in an error correcting mode when the impingement by an atomic particle or a combination of atomic particles exceeds a predetermined value.

* * * * *